United States Patent
Okada

(10) Patent No.: US 8,323,826 B2
(45) Date of Patent: Dec. 4, 2012

(54) SEALED SECONDARY BATTERY

(75) Inventor: Yukihiro Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 740 days.

(21) Appl. No.: 12/439,805

(22) PCT Filed: Oct. 9, 2007

(86) PCT No.: PCT/JP2007/069679
§ 371 (c)(1),
(2), (4) Date: Mar. 3, 2009

(87) PCT Pub. No.: WO2008/050604
PCT Pub. Date: May 2, 2008

(65) Prior Publication Data
US 2010/0209749 A1    Aug. 19, 2010

(30) Foreign Application Priority Data
Oct. 24, 2006    (JP) .................... 2006-288970

(51) Int. Cl.
*H01M 6/42* (2006.01)
*H01M 2/00* (2006.01)
*H01M 2/02* (2006.01)

(52) U.S. Cl. .................. 429/164; 429/149; 429/163

(58) Field of Classification Search .................. None
See application file for complete search history.

(56) References Cited

U.S. PATENT DOCUMENTS

| | | | |
|---|---|---|---|
| 6,245,465 B1 * | 6/2001 | Angell et al. | 429/340 |
| 6,551,741 B1 * | 4/2003 | Hamada et al. | 429/151 |
| 7,397,218 B2 | 7/2008 | Rejman | |
| 2001/0046624 A1 * | 11/2001 | Goto et al. | 429/99 |

FOREIGN PATENT DOCUMENTS

| | | |
|---|---|---|
| CN | 1747195 A | 3/2006 |
| JP | 2000-348696 | 12/2000 |
| JP | 2001-057199 | 2/2001 |
| JP | 2001-185225 | 7/2001 |
| JP | 2003-059526 | 2/2003 |
| JP | 2003-249200 | 9/2003 |
| JP | 2004-281155 | 10/2004 |

OTHER PUBLICATIONS (http://www.merriam-webster.com/dictionary/hollow, accessed on May 1, 2012, no author.*
Chinese Office Action issued in Chinese Patent Application No. 200780033970.X, dated Jun. 12, 2010.

* cited by examiner

*Primary Examiner* — Barbara Gilliam
*Assistant Examiner* — Adam A Arciero
(74) *Attorney, Agent, or Firm* — McDermott Will & Emery LLP

(57) ABSTRACT

A battery casing 10 includes a plurality of cylindrical accommodation parts 12a to 12d accommodating a plurality of electrode assemblies 20, and connecting parts 13a to 13c connecting the accommodation parts 12a to 13d adjacent to each other. The inner circumferences of the accommodation parts 12a to 12d have substantially the same shape as the outer circumferences of the electrode assemblies. The connecting parts 13a to 13c are formed along the side surfaces of the accommodation parts 12a to 12d. Each electrode assembly 20 is formed by winding a positive electrode plate 21 and a negative electrode plate 22 with a separator 23 interposed therebetween to be in a cylindrical shape. The plurality of electrode assemblies 20 are accommodated in the accommodation parts 12a to 12d with substantially no gap left.

7 Claims, 8 Drawing Sheets

SEALED SECONDARY BATTERY

RELATED APPLICATIONS

This application is the U.S. National Phase under 35 U.S.C. §371 of International Application No. PCT/JP2007/069679, filed on Oct. 9, 2007, which in turn claims the benefit of Japanese Application No. 2006-288970, filed on Oct. 24, 2006, the disclosures of which Applications are incorporated by reference herein.

TECHNICAL FIELD

The present disclosure relates to large-capacity sealed secondary batteries as driving power supplies, backup power supplies, and the like.

BACKGROUND ART

Sealed secondary batteries include nickel metal hydride batteries, nickel cadmium batteries, and the like. Among of all, nonaqueous electrolyte secondary batteries typified by lithium ion batteries are small in weight and size and has high energy density, and are therefore employed in various usages as driving power supplies and backup power supplies for consumer-use appliances, such as mobile phones, electric vehicles, electric power tools and the like. Particularly, the nonaqueous electrolyte secondary batteries are becoming a focus of attention as the driving power supplies and the backup power supplies, and are under active development for increasing their capacity.

In order to increase the battery capacity, the electrode areas of the electrode assemblies may be increased by increasing the number of windings of the positive electrode and the negative electrode with the separator interposed therebetween, for example. However, as the number of windings is increased, the heat dissipation becomes worse, thereby leading to non-uniform temperature in the battery. This may causes shortening of the battery lifetime. In addition, an increased number of windings may cause a problem such as misaligned windings, and presents various manufacturing problems.

As a strategy for solving the above problems accompanied by upsizing of the batteries, Patent Document 1 discloses a method of accommodating an electrode assembly in a container with it separated into a plurality of small electrode assemblies.

FIG. 10 is a perspective view showing a configuration of a battery casing disclosed in Patent Document 1. As shown in FIG. 10, small electrode assemblies 102 each covered with a resin film 101 are accommodated in a container 103 partitioned by a plurality of metal-made partitions 104, so that heat generated at each electrode assembly 102 is released outside the container 103 effectively via the metal-made partitions 104.

However, the plurality of small electrode assemblies 102 accommodated in the container 13 are separated from one anther completely by the partitions 104. Therefore, upon occurrence of abnormality, for example, an uprush of gas or the like in some of the small electrode assemblies 102, the internal pressure of the part accommodating the small assembly 102 abruptly increases to cause the abnormally generated gas to jet out from the container 103.

To tackle this problem, Patent Document 2 discloses a method of communicating a plurality of compartments accommodating such small electrode assemblies to each other through communication paths.

FIG. 11 and FIG. 12 are sectional views showing a configuration of a battery casing disclosed in Patent Document 2. As shown in FIG. 11, the battery casing 201 accommodating a plurality of electrode assemblies is divided into accommodation parts 202, in which the electrode assemblies 203 are accommodated. Referring to a lid 204 arranged on top of the battery casing 201, as shown in FIG. 12, through holes 205 are formed in the vicinity of the boundaries of respective adjacent accommodation parts 202, and communication paths 206 for communicating the associated through holes 205 are formed in the upper part of the lid 204.

In the above configuration, since the accommodation parts 202 separated from one another share the spaces through the communication paths 206, gas generated at some most degraded electrode assembly 203 can be released to the other accommodation parts 202. This can balance the degradation degrees of the electrode assemblies 203 to prevent the lifetime of the battery as a whole from being shortened.

Patent Document 1: Japanese Unexamined Patent Application Publication No. 2000-348696
Patent Document 2: Japanese Unexamined Patent Application Publication No. 2001-057199
Patent Document 3: Japanese Unexamined Patent Application Publication No. 2001-185225

Problems that the Invention is to Solve

The method disclosed in Patent Document 2 can release the gas generated in some accommodation part 202 to the other accommodation parts 202 through the communication paths 206 to exhibit an advantage of balancing the degradation degrees of the electrode assemblies 203. However, the communication paths 206 are formed in the upper part of the lid 204, which means that the volume that the communication paths 206 occupy is rather smaller than the entire volume of the accommodation parts 202.

The method disclosed in Patent Document 2 is contemplated for application to nickel metal hydride batteries that necessitate prevention of self-discharge caused due to movement of the electrolyte between the accommodation parts 202. Accordingly, a strategy is provided. For example, dykes for ensuring prevention of short-circuit of the electrolyte are formed in the communication paths 206 formed in the upper part of the lid 204, as shown in FIG. 12.

As described above, the nickel meal hydride batteries are constrained in position of the communication paths 206 (to the upper part of the lid 204). While, the positive electrodes of the nickel metal hydride batteries have, in the end stage of discharge, potential near the potential at which the oxygen is generated, and therefore, gas is generated all the time in the accommodation parts 202. Therefore, the battery is generally so configured to absorb the gas generated in the accommodation parts 202 by allowing the gas to react with proton in a hydrogen absorbing alloy of the negative electrode. For this reason, though the volume that the communication paths 206 occupy is set to the least extent that only variation in internal pressure of the accommodation parts 202 can be kept averaged, the above purpose can be attained satisfactorily.

Turning to the nonaqueous electrolyte secondary batteries, such as lithium ion batteries, when an abnormal current is caused by, for example, a short circuit between the positive electrode and the negative electrode caused due to contamination by foreign matter, gasification accompanied by thermal decomposition of the active materials, evaporation of the electrolyte accompanied by heat generation at the short-circuited part, or the like may be caused abruptly. If such abrupt gas generation is caused in some electrode assembly 203, it is difficult to swiftly release the abnormally generated gas to the other accommodation parts 202 through only the communication paths 206 formed in the upper part of the lid 204.

In the lithium ion batteries, the current collectors composing the positive electrode or the negative electrode are formed with very thin metal foils. Accordingly, where the positive electrode plate and the negative electrode plate are wound with the separator interposed therebetween to form a cylindrical electrode assembly, off-core of the electrode assembly may be caused upon an increase in internal pressure by abnormal gas generation in some accommodation part 202. Off-core can promote abnormal gas generation to form a vicious circle.

The present invention has been made in view of the foregoing, and it objective is to provide, in a sealed secondary battery including a plurality of electrode assemblies accommodated in a battery casing, a highly reliable sealed secondary battery of which the electrode assemblies are stable in characteristics.

Means for Solving the Problems

A sealed secondary battery in accordance with the present invention includes a plurality of cylindrical electrode assemblies sealed in a battery casing, each of the electrode assemblies being formed by winding a positive electrode plate and a negative electrode with a separator interposed therebetween, wherein the battery casing includes a plurality of cylindrical accommodation parts configured to accommodate the plurality of electrode assemblies, and a connecting part configured to connect the accommodation parts adjacent to each other, the accommodation parts have inner circumferences having a substantially same shape as that of outer circumferences of the electrode assemblies, and the connecting part is formed along side surfaces of the accommodation parts.

With the above configuration, even upon abnormal gas generation in some of the accommodation parts, the gas can be released to the adjacent accommodation parts swiftly through the connecting part formed along the side surfaces of the accommodation parts. The volume that the connecting part occupies can be increased, and accordingly, the characteristics of the electrode assemblies accommodated in the accommodation parts can be stabilized.

The cylindrical electrode assemblies are accommodated in the cylindrical accommodation parts of which the inner circumferences have substantially the same shape as the outer circumferences of the electrode assemblies. This can allow the internal circumferences of the accommodation parts entirely to hold the electrode assemblies while pressing the outer circumferences thereof. Further, an increase in internal pressure by abnormal gas generation in some accommodation part may not accompany off-core of the electrode assemblies.

In the case where the accommodation parts are filled with electrolyte liquid of a nonaqueous electrolyte or an organic gel electrolyte, since the electrolyte is nonaqueous type unlike an alkaline aqueous solution as an electrolyte of a nickel metal hydride battery, the gas generation amount and the gas generation rate at abnormal gas generation are large. Hence, the configuration of this application is especially effective.

When the plurality of accommodation parts have end parts forming an open end deformed in a substantially elliptic shape along an envelope of outer contours of the accommodation parts, and the open end is sealed with a sealing portion in the substantially elliptic shape substantially same as an outer contour of the open end, the open end can be sealed easily with the sealing portion by welding or the like.

Advantages of the Invention

According to the sealed secondary battery in accordance with the present invention, even upon abnormal gas generation in some accommodation part, the gas can be released to the adjacent accommodation parts swiftly through the connecting part formed along the side surfaces of the accommodation parts. Further, the outer circumferences of the electrode assemblies are held and pressed by the entirety of the internal circumferences of the accommodation parts, which can suppress off-core of the electrode assemblies effectively. Hence, the characteristics of each electrode assembly may be stabilized, thereby realizing a highly reliable and highly safety sealed secondary battery.

INDEX OF REFERENCE NUMERALS

Figure 1:
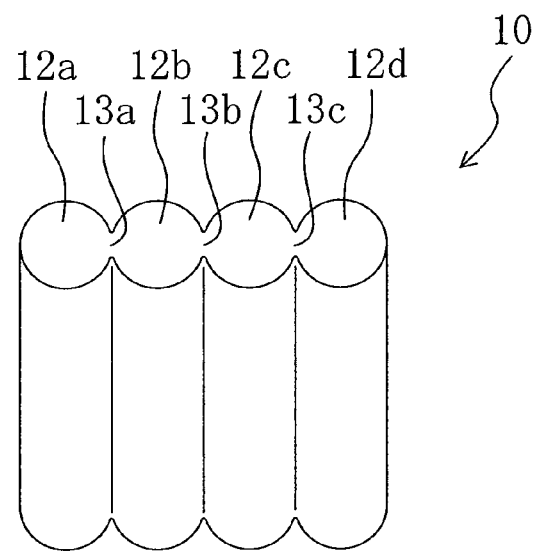
FIG. 1 is a perspective view showing a configuration of a battery casing in accordance with an embodiment of the present invention.

10 battery casing
12*a* to 12*c* accommodation part
13*a* to 13*c* connecting part
14, 15 open end
16 sealing portion
16*a* to 16*d* protrusion
20, 20*a* to 20*d* electrode assembly
21 positive electrode plate
22 negative electrode plate
23 separator
24 positive electrode lead
25 negative electrode lead
30 sealed secondary battery
31 positive electrode current collector plate 32 sealing plate (sealing portion)
33 aluminum lead
34 electrode plug
35 gasket
36 injection port
37 safety valve

BEST MODE FOR CARRYING OUT THE INVENTION

Embodiments of the present invention will be described below with reference to the accompanying drawings. In the below-mentioned drawings, the same reference numerals are assigned to the elements having substantially the same functions for the purpose of simplicity of explanation. It is noted that the present invention is not limited to the following embodiments.

FIG. 1 is a perspective view schematically showing a configuration of a battery casing 10 used in a sealed secondary battery in accordance with an embodiment of the present invention.

As shown in FIG. 1, the battery casing 10 includes a plurality of cylindrical accommodation parts 12a to 12d accommodating a plurality of electrode assemblies, and connecting parts 13a to 13c connecting the accommodation parts 12a to 12d adjacent to each other. The inner circumferences of the accommodation parts 12a to 13a have substantially the same shape as the outer circumferences of the electrode assemblies, and the connecting parts 13a to 13c are formed along the side surfaces of the accommodation parts 12a to 12d.

Each electrode assembly 20 accommodated in the battery casing 10 is formed into a cylindrical shape by winding a positive electrode plate 21 and a negative electrode plate 22 with separators 23 interposed therebetween, and the plurality of electrode assemblies 20 are accommodated in the accommodation parts 12a to 12d with substantially no gap left therebetween.

Figure 3:
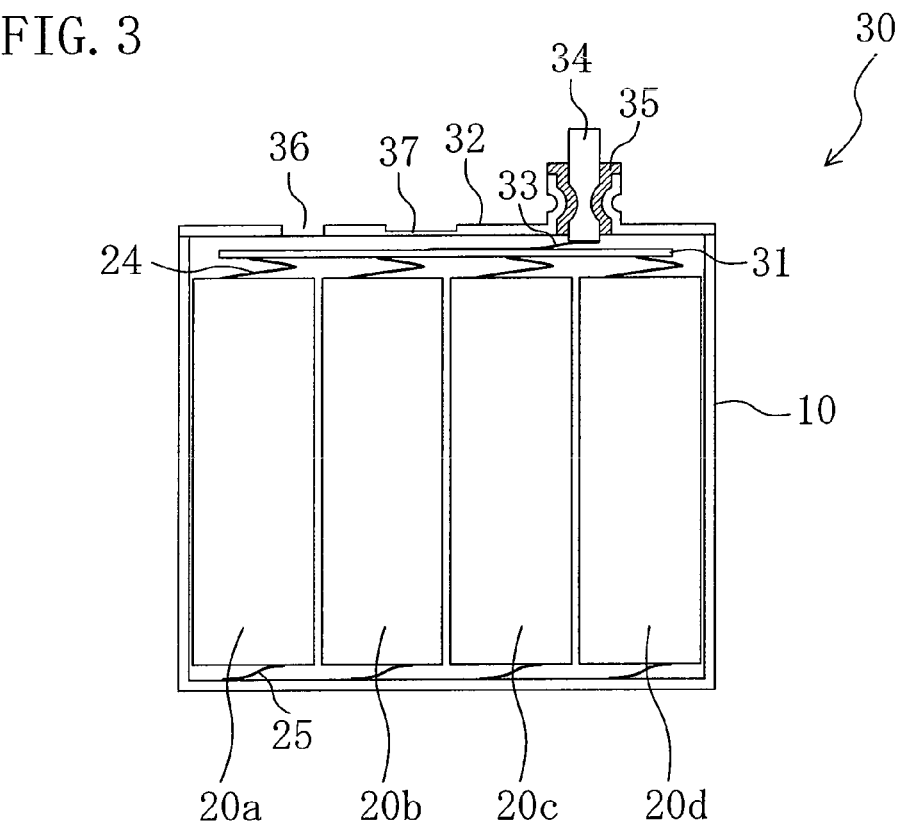
FIG. 3 is a sectional view showing a configuration of a sealed secondary battery in accordance with the embodiment.

FIG. 3 is a sectional view schematically showing a configuration of a sealed secondary battery 30 in which the plurality of cylindrical electrode assemblies 20 are sealed in the battery casing 10.

As shown in FIG. 3, the electrode assemblies 20a to 20d are accommodated in the plurality of accommodation parts of the battery casing 10. A positive electrode lead 24 welded to an end part of the positive electrode plate 21 is welded to a positive electrode current collector plate 31, while a negative electrode lead 25 welded to an end part of the negative electrode plate 22 is welded to the bottom of the battery casing 10. The upper open end of the battery casing 10 is sealed with and welded to a sealing plate 32, and the positive electrode current collector plate 31 is welded to an electrode plug 34 provided in the sealing plate 32 through a lead 33. The sealing plate 32 and the electrode plug 34 are insulated from each other by means of a gasket 35. The electrolyte is injected through an injection port 36 formed in the sealing plate 32, and a safety valve 37 is arranged at a part of the sealing plate 32.

In the thus configured sealed secondary battery, even upon abnormal gas generation in some of the accommodation parts 12a to 12d, the gas can be released swiftly to the adjacent accommodation parts 12a to 12d through the connecting parts 13a to 13c formed along the side surfaces of the accommodation parts 12a to 12d.

The cylindrical electrode assemblies 20a to 20d are accommodated in the cylindrical accommodation parts 12a to 12d of which the inner circumferences have substantially the same shape as the outer circumferences of the cylindrical electrode assemblies 20a to 20d, and accordingly, the internal circumferences of the accommodation parts 12a to 12d entirely can hold the electrode assemblies 20a to 20d while pressing the outer circumferences thereof. With this configuration, even if abnormal gas generation in some accommodation part accompanies an increase in internal pressure, off-core of the electrode assemblies can be suppressed.

In the case where the electrolyte filled in each accommodation part 12a to 12d is a nonaqueous electrolyte, the gas generation amount and rate at abnormal gas generation are great. Therefore, formation of the connecting parts 13a to 13c along the side surfaces of the accommodation parts 12a to 12d contributes to effective space security. The same advantages can be achieved in the case using an organic gel electrolyte.

By exhibition of the above advantages, the characteristics of the electrode assemblies 20a to 20d accommodated in the accommodation parts 12a to 12d can be stabilized, thereby realizing a highly reliable sealed secondary battery.

The shapes of the accommodation parts 12a to 12d and the electrode assemblies 20a to 20d are not limited to complete round cylindrical shapes, and may be cylindroid shapes (elliptic cylindrical shapes) formed by pressing cylindrical electrode assemblies, for example.

Figure 4:
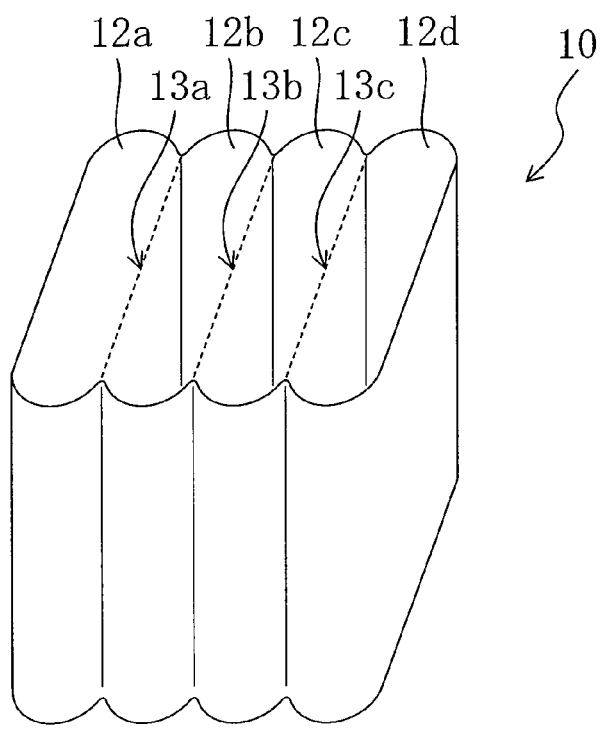
FIG. 4 is a perspective view showing a configuration of a battery casing in an embodiment of the present invention.
Figure 5:
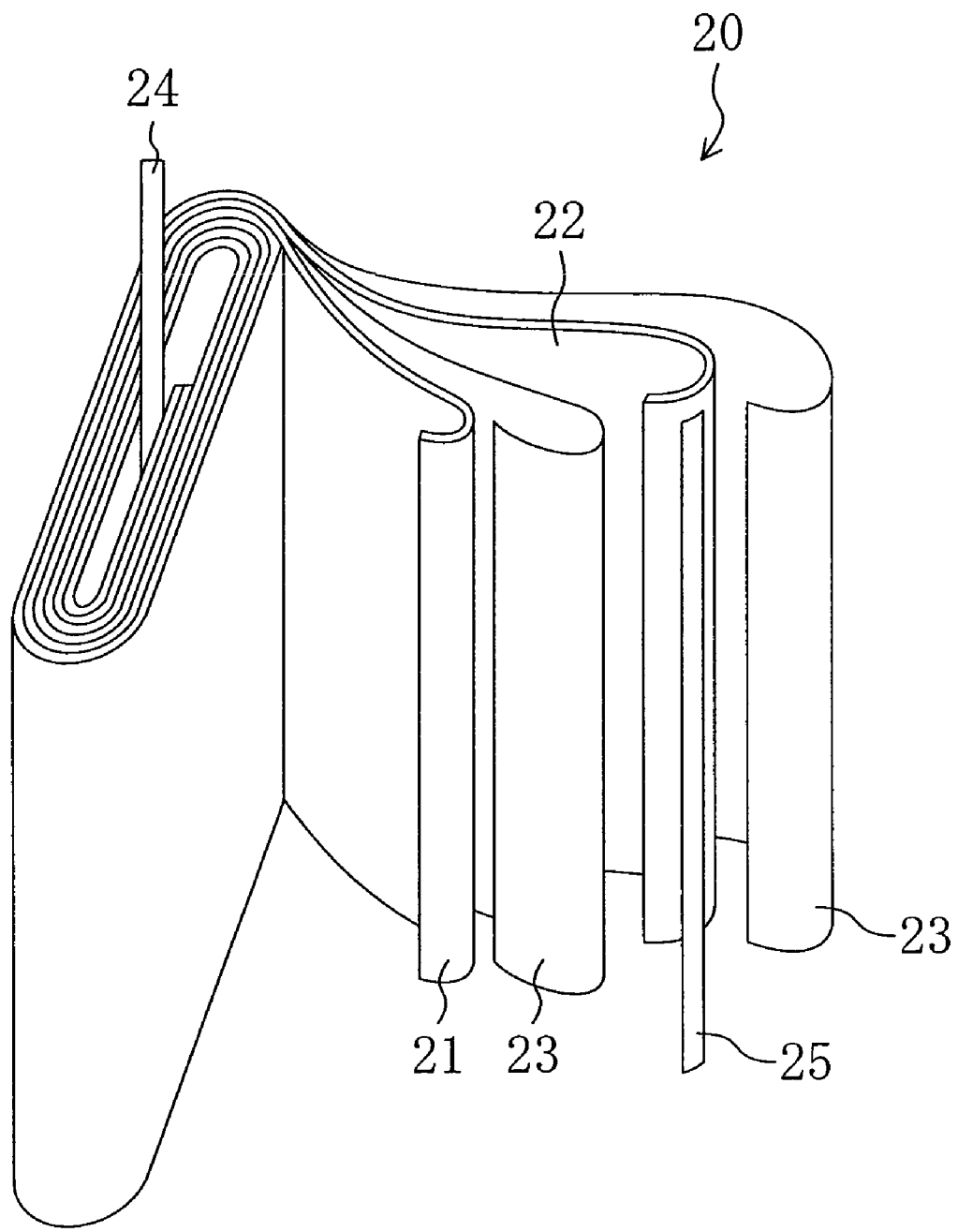
FIG. 5 is an illustration showing a configuration of an electrode assembly in accordance with an embodiment.

FIG. 4 is a perspective view schematically showing a configuration of a battery casing 10 where the accommodation parts and the electrode assemblies are in cylindroid shapes in a sealed secondary battery in accordance with an embodiment of the present invention.

As shown in FIG. 4, the battery casing 10 includes a plurality of accommodation parts 12a to 12d in a cylindroid shape accommodating a plurality of electrode assemblies, and connecting parts 13a to 13c connecting the accommodation parts 12a to 12d adjacent to each other. The inner circumferences of the accommodation parts 12a to 12d have substantially the same shape as the outer circumferences of the electrode assemblies, and the connecting parts 13a to 13c are formed along the side surfaces of the accommodation parts 12a to 12d.

Each electrode assembly 20 accommodated in the battery casing 10 is formed into a cylindroid shape by winding the positive electrode plate 21 and the negative electrode plate 22 with the separators 23 interposed therebetween. The plurality of electrode assemblies 20 are accommodated in the accommodation parts 12a to 12d with substantially no gap left.

In the thus configured sealed secondary battery, even upon abnormal gas generation in some of the accommodation parts 12a to 121d, the gas can be released swiftly to the adjacent accommodation parts 12a to 12d through the connecting parts 13a to 13c formed along the side surfaces of the accommodation parts 12a to 12d.

The cylindroid electrode assemblies 20 are accommodated in the cylindroid accommodation parts 12a to 12d, the inner circumferences of which have the same shape as the outer circumferences of the electrode assemblies 20, so that the inner circumferences of the accommodation parts 12a to 12d entirely can hold the electrode assemblies 20 while pressing the outer circumferences thereof. With this configuration, even upon an increase in inner pressure caused by abnormal gas generation in some accommodation part, off-core of the electrode assemblies can be suppressed.

Although any material can be used for the accommodation parts 12a to 12d and the connecting parts 13a to 13c, integral formation of the accommodation parts 12a to 12d and the connecting parts 13a to 13c increases the strength of the battery casing 10 while reducing the number of parts to lead to advantages in cost and quality.

The battery casing 10 may be formed by various methods. For example, the accommodation parts 12a to 12d and the connecting parts 13a to 13c can be integrally formed by extrusion. Alternatively, DI (Drawing & Ironing) can attain integral formation of the accommodation parts 12a to 12d, the connecting parts 13a to 13c, and the bottom part in addition. In anther embodiment, the connecting parts 13a to 13c may be formed by pressing after a cylindroid battery casing is formed.

In the sealed secondary battery in accordance with the present invention, no specific limitation is imposed in configuration except the configuration described in the present embodiment, and various configurations employable in ordinary sealed secondary batteries are applicable.

For example, the battery casing may be made of iron, nickel, iron-nickel plating, stainless, aluminum, or the like, for example.

The current collector composing the positive electrode plate may be formed with aluminum foil or perforated body, or the like. Examples of the material of the positive electrode active material include lithium cobaltate, lithium nickelate, lithium manganese, lithium iron phosphate and other composite oxides or denatured substances thereof, and the like. The natured substances may be mixed with and contain any element of aluminum, magnesium, cobalt, nickel, manganese, and the like. The surface of the positive electrode active material may be coated with another material. As the conductive material, any of graphite, carbon black, conductive oxides, metal powder, and the like may be employed which are stable under the positive electrode potential. The binder may be polyvinylidene difluoride (PVDF), polytetrafluoroethylene (PTFE), or the like.

On the other hand, the current collector composing the negative electrode plate is formed with a copper foil, a copper perforated body, or the like. Examples of the material of the negative electrode active material include natural graphite, artificial graphite, aluminum and various alloys containing any of them as a main component, tin oxide, silicon oxide and other metal oxides, and metal nitrides. As the conductive material, any of graphite, carbon black, conductive oxides, metal powder, and the like may be employed which are stable under the negative electrode potential. The binder may be styrene butadiene rubber (SBR), carboxymethyl cellulose (CMC), polyvinylidene difluoride (PVDF), polytetrafluoroethylene (PTFE), or the like.

The separator may be formed with a porous film, nonwoven fabric, or the like made of polyolefin.

Figure 2:
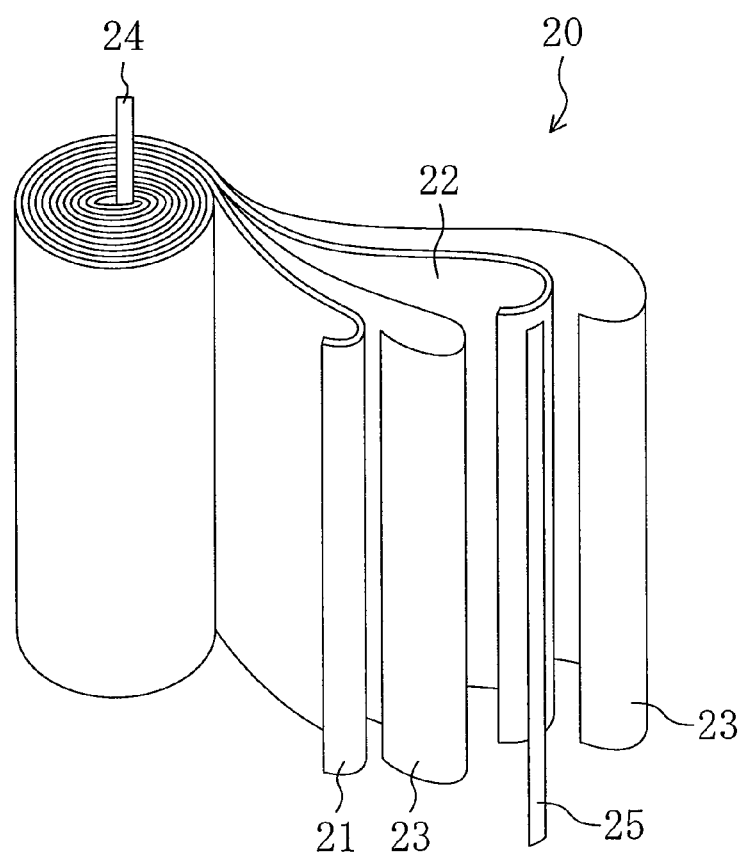
FIG. 2 is an illustration showing a configuration of an electrode assembly in accordance with the embodiment.

The positive electrode plate 21 and the negative electrode plate 22 shown in FIG. 2 may be formed in such a manner that the active material obtained by kneading any of the above conductive materials and any of the above binders is applied on the current collector, and the positive electrode lead 24 or the negative electrode lead 25 is welded to a non-coated end part of the current collector. Then, the positive electrode plate 21 and the negative electrode plate 22 are wound with the separators 23 interposed therebetween so that the positive electrode lead 24 and the negative electrode lead 25 are able to be lead out from different directions from each other, thereby completing the electrode assembly 20.

The nonaqueous electrolyte mainly contains a nonaqueous solvent and a solute. The solute may be lithium hexafluorophosphate ($LiPF_6$), lithium tetrafluoroborate ($LiBF_4$), or any other lithium salt. Examples of the nonaqueous solvent include ethylene carbonate, propylene carbonate and other cyclic carbonates, dimethyl carbonate, diethyl carbonate, ethylmethyl carbonate and other chain carbonates, and the like. The nonaqueous solvent may be made of a sole substance or two kinds of substances in combination. Vinylene carbonate, cyclohexyl benzene, diphenyl ether, or any other additive may be added.

As the organic gel electrolyte, a polymer material containing a nonaqueous electrolyte may be used.

Referring to the gasket 35, it may be made of crosslinked polypropylene (PP) resin, polybutylene terephthalate (PBT) resin, polyphenylene sulfide (PPS) resin, perfluoroalkoxy alkane (PFA) resin, polytetrafluoroethylene (PTFE) resin, or the like.

The sealing plate 32 may be made of iron, nickel, iron-nickel plating, stainless, aluminum, or a clad material of any of them.

Examples of secondary batteries using a nonaqueous electrolyte or an organic gel electrolyte suitable to the present embodiment include lithium ion batteries, lithium ion polymer batteries, and the like.

Modified Examples of Embodiment

In the sealed secondary battery of the present invention, the open end of the battery casing 10 is sealed with the sealing portion after a plurality of electrode assemblies are accommodated in the accommodation parts 12a to 12d. Because the connecting parts 13a to 12c have a constricted shape as shown in FIG. 1, a somewhat complicated step when compared with usual welding is required for sealing the sealing portion to the open end of the battery casing 10 by welding.

In the present modified example, the configuration of the battery casing 10, for which an improvement on manufacture is implemented, will be described with reference to FIG. 6 to FIG. 9.

Figure 6:
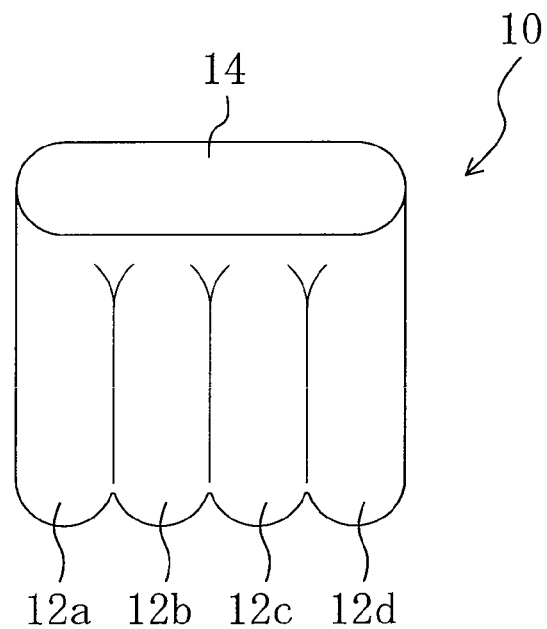
FIG. 6 is an illustration showing a configuration of a battery casing in accordance with a first modified example.

FIG. 6 illustrates a configuration of a battery casing 10 in the first modified example. Though the basic elements are the same as those in FIG. 1, one ends (the upper ends in the drawing) of the plurality of the accommodation parts 12a to 12d form an open end 14 deformed substantially in an elliptic shape along the envelope drawn by the outer contours of the accommodation parts 12a to 12d.

For welding the sealing portion to the open end 14 having the above shape, the sealing portion may be formed to have substantially the same elliptic shape (in plan) as the outer contour of the open end 14. This may facilitate the welding.

Even with the above configuration, almost all regions of the accommodation parts 12a to 12d except the region in the vicinity of the open end can hold and press the electrode assemblies 20a to 20d. Hence, even upon an increase in internal pressure by abnormal gas generation in some accommodation part, the advantages of suppressing off-core of the electrode assemblies may not be lost.

Figure 7:
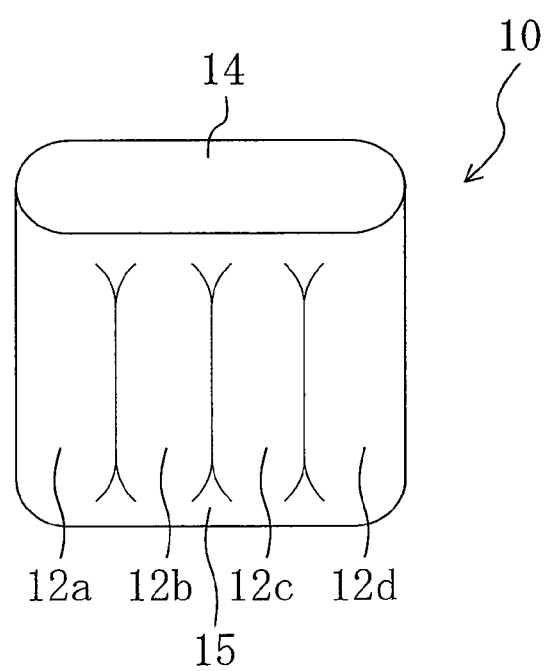
FIG. 7 is an illustration showing a configuration of a battery casing in accordance with a second modified example.

FIG. 7 illustrates a configuration of a battery casing 10 in the second modified example. The other ends (the lower ends in the drawing) of the plurality of accommodation parts 12a to 12d also form an open end 15 deformed substantially in an elliptic shape similar to that shown in FIG. 6. In the case, for example, where the bottom of the battery casing 10 is not integrally formed with the accommodation parts 12a to 12d and the connecting parts 13a to 13c, welding of a sealing portion to the bottom of the battery casing 10 may be facilitated.

Figure 8:
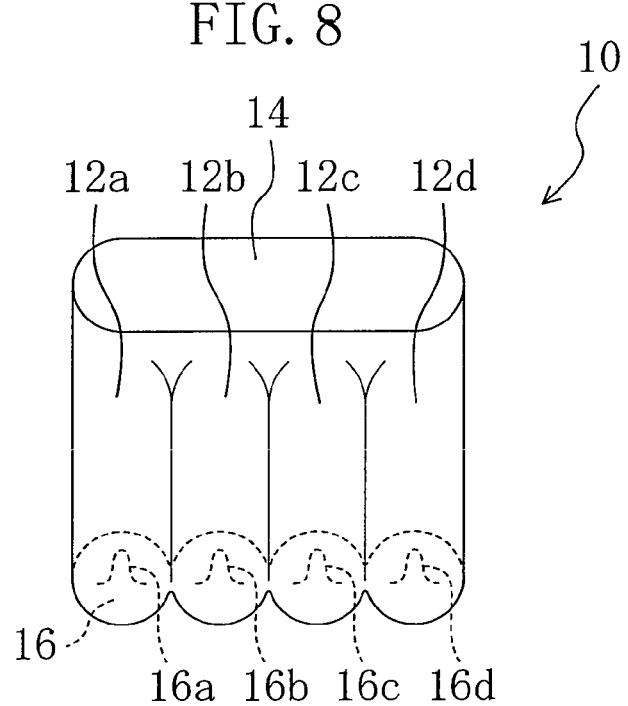
FIG. 8 is an illustration showing a configuration of a battery casing in accordance with a third modified example.

FIG. 8 illustrates a configuration of a battery casing 10 in the third modified example. In the battery casing 10 shown in FIG. 6, the other ends (the lower ends in the drawing) of the accommodation parts 12a to 12d are sealed with a flat sealing portion 16 having an inside surface on which protrusions 16a to 16d are formed.

In the present invention, the cylindrical electrode assemblies 20a to 20d are accommodated in the cylindrical accommodation parts 12a to 12d, the inner circumferences of which have substantially the same shape as the outer circumferences of the electrode assemblies 20a to 20d. Accordingly, the electrode assemblies 20a to 20d can be held by the inner walls of the accommodation parts 12a to 12d. Nevertheless, slight gap must be left for inserting the electrode assemblies 20a to 20d into the accommodation parts 12a to 12d. As a result, the electrode assemblies 20a to 20d having accommodated in the accommodation parts 12a to 12d can vary in position to invite variation in characteristics of the electrode assemblies.

In such a case, the electrode assemblies 20a to 20d may be inserted into the accommodation parts 12a to 12d so that the winding core parts of the electrode assemblies 20a to 20d are fitted into the protrusions 16a to 16d formed at the bottom of the battery casing 10. This can suppress the variation in position of the electrode assemblies 20a to 20d.

Figure 9:
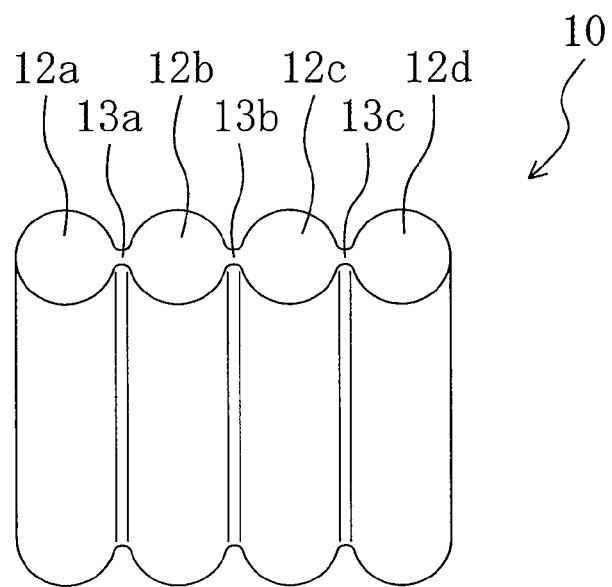
FIG. 9 is an illustration showing a configuration of a battery casing in accordance with a fourth modified example.
Figure 10:
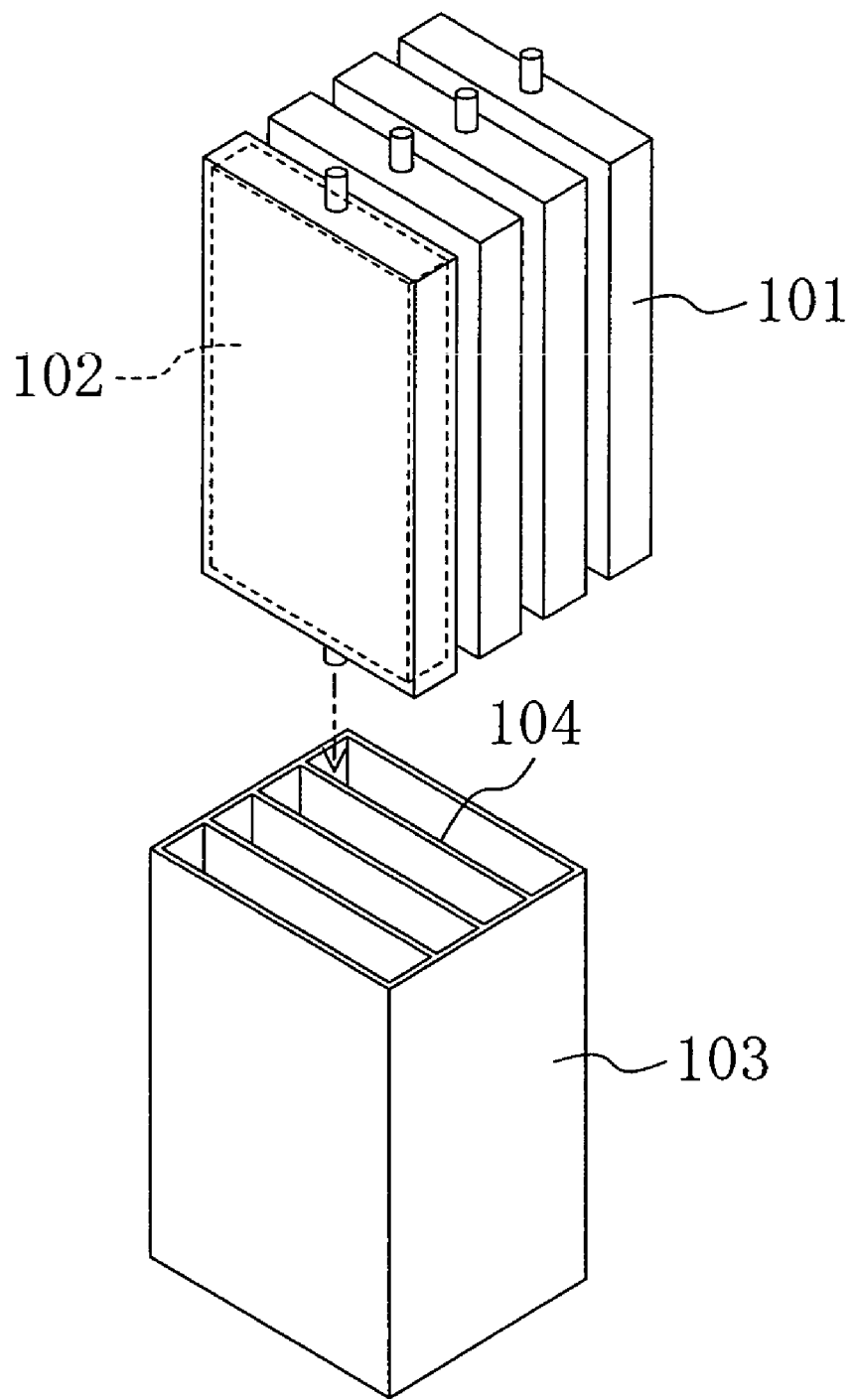
FIG. 10 is a perspective view showing a configuration of a battery casing of a conventional sealed secondary battery.
Figure 11:
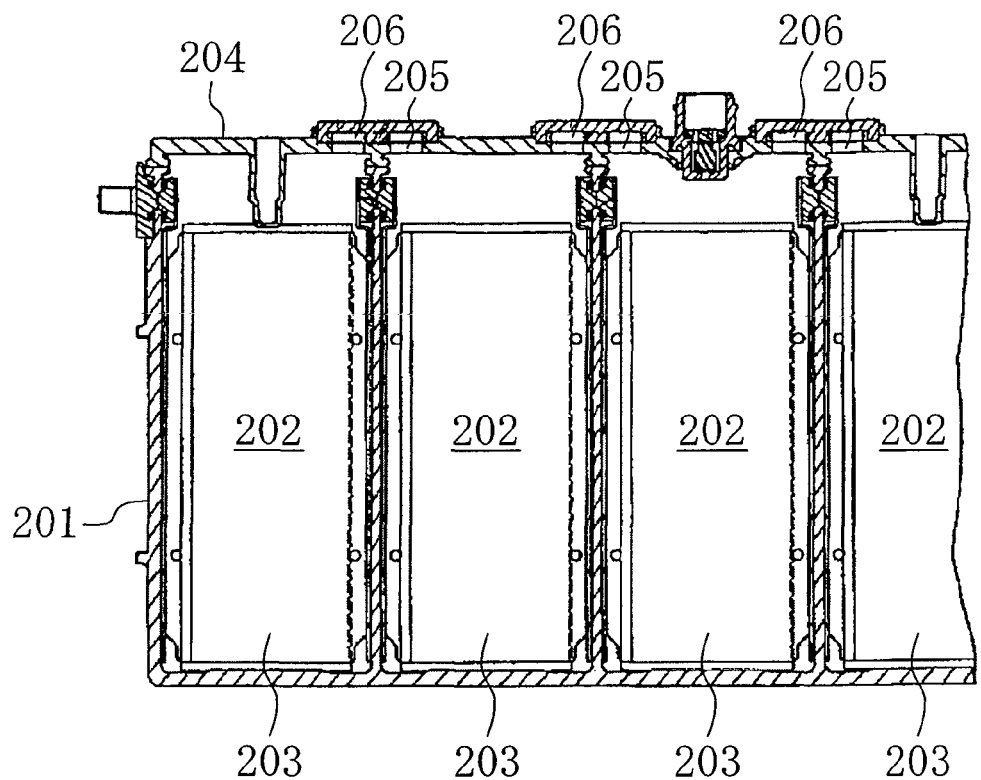
FIG. 11 is a sectional view showing the configuration of the battery casing of the conventional sealed secondary battery.
Figure 12:
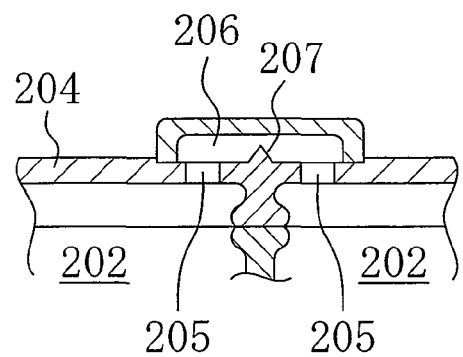
FIG. 12 is a sectional view showing a configuration of a communication path formed in the conventional battery casing.

FIG. 9 illustrates a configuration of a battery casing 10 in the fourth modified example. Each connecting part 13a to 13c is processed into a shape of which at least the central part thereof is linear. With this configuration, the volume of the connecting parts 13a to 13c can be increased without losing the advantage that the accommodation parts 12a to 12d can hold the electrode assemblies 20a to 20d. As a result, the reliability and the safety of the sealed secondary battery can be increased.

Hereinafter, a specific method for fabricating the sealed secondary battery in an embodiment of the present invention will be described by referring to a lithium ion battery (a nonaqueous secondary battery) as an example.

(1) Preparation of Battery Casing

The battery casing 10 in a shape, as shown in FIG. 1, with the accommodation parts 12a to 12d and the connecting parts 13a to 13c each having a thickness of approximately 0.25 mm is formed by extruding an iron plate. Then, a bottom portion having a contour agreeing with the bottom of the thus formed the battery casing 10 is welded thereto by laser welding.

(2) Preparation of Sealing Plate

The sealing plate 32 as shown in FIG. 3 is prepared using an iron plate. In the sealing plate 32, there are formed: the safety valve 37 configured to open to release gas upon an increase in internal pressure caused due to thinning and channel formation; the injection port 36 for electrolyte; the electrode plug 34 of aluminum configured to lead the positive electrode potential outside the battery casing 10; and the gasket 35 of crosslinked polypropylene (PP) resin configured to insulate the electrode plug 34 from the sealing plate 32.

(3) Preparation of Positive Electrode Plate

Kneaded are: lithium cobaltate powder of 85 weight parts as a positive electrode mixture; carbon powder of 10 weight parts as a conductive material; and polyvinylidene difluoride (PVDF) of 5 weight parts as a binder dissolved in N-methyl-2-pyrolidone (NMP) solution. The resultant mixture is applied onto an aluminum foil having a thickness of 15 μm, is dried, and is then rolled to form the positive electrode plate 21 having a thickness of approximately 100 μm. To the positive electrode plate 21, the positive electrode lead 24 of aluminum is attached.

(4) Preparation of Negative Electrode Plate

Kneaded are artificial graphite of 95 weight parts as a negative electrode mixture and PVDF of 5 weight parts as a binder dissolved in NMP solution. The resultant mixture is applied onto a copper foil having a thickness of 10 μm, is dried, and is then rolled to form the negative electrode plate 22 having a thickness of approximately 110 μm. To the negative electrode plate 22, the negative electrode lead 25 of copper is attached.

(5) Adjustment of Nonaqueous Electrolyte

As the nonaqueous solvent, ethylene carbonate and ethylmethyl carbonate are mixed with each other at a volume ratio of 1:1, and are solved so that the amount of lithium hexafluophosphate ($LiPF_6$) as a solute is 1 mol/L. The thus adjusted nonaqueous electrolyte of 15 ml is used.

(6) Preparation of Electrode Assembly

The separators having a thickness of 25 μm are placed between the positive electrode plate 21 and the negative electrode plate 22, and they are wound to form a cylindrical electrode assembly 20a to 20d having a diameter of 23 mm and a height of 57 mm.

(7) Fabrication of Sealed Secondary Battery

Four cylindrical electrode assemblies 20a to 20d are inserted into the battery casing 10, and each negative electrode lead 25 of the electrode assemblies 20a to 20d is welded to the bottom of the battery casing 10. Each positive electrode lead 24 of the electrode assemblies 20a to 20d is welded to the current collector plate 31, and the current collector plate 31 and the electrode plug 34 formed at the sealing plate 32 are connected to each other through the aluminum lead 33 by welding. Then, the sealing plate 32 and the battery casing 10 are laser welded to each other to be sealed. The nonaqueous electrolyte is then injected through the injection port 36 formed in the sealing plate 32, and finally, the injection port 36 is sealed. Thus, the sealed nonaqueous electrolyte secondary battery is obtained.

Figure 13A:
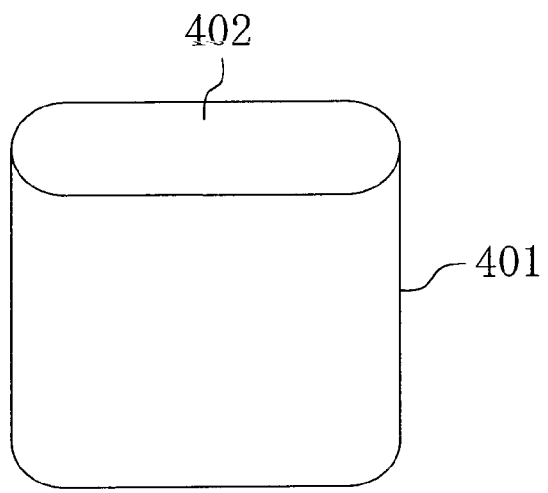
FIG. 13 is an illustration showing a configuration of a battery casing in a comparative example.
Figure 13B:
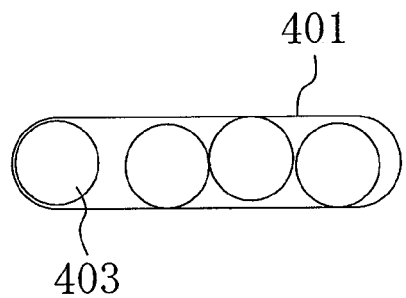

Next, the cyclic lifetime characteristics and variation in the number of cycles until reaching their end were evaluated in lithium ion batteries fabricated by the above method and having the battery casings 10 to which the configuration of the present embodiment shown in FIG. 1 and the configurations of the first to fourth modified examples shown in FIG. 6 to FIG. 9 were applied. The designed capacity of the batteries wes set at 8 Ah. Each ten batteries were prepared for evaluation. Additionally, lithium ion batteries fabricated using a conventional battery casing 401 shown in FIG. 13(a) and FIG. 13(b) were evaluated as a comparative example.

The evaluation method was as follows. First, three-day aging was carried out under an atmosphere at a temperature of 45° C. with the batteries allowed to charge at 1 A up to 4.1 V. Thereafter, the batteries were allowed to discharge at 1 A up to 3 V under an atmosphere at a temperature of 25° C. Then, a cycle of constant current charge at 8 A under an atmosphere at a temperature of 45° C. until reaching 4.2 V and discharge at 8 A up to 3 V was repeated. Variations in the average number of accumulated cycles at the time when the capacities became below 6 Ah and in the number of accumulated cycles until reaching their end were evaluated.

Each variation (dispersion) Y was obtained by the following Equation 1.

$$Y = \sum_{n=1}^{10} \{(A - B_n)^2\} \div 10 \qquad \text{(Equation 1)}$$

Wherein, Y is a variation in the number of accumulated cycles at the time when the capacity becomes below 6 Ah; A is an average of the numbers of accumulate cycles at the time when each capacity of the ten lithium ion batteries become below 6 Ah; and $B_n$ is the number of accumulated cycles at the time when the capacity of an nth lithium ion battery of the ten lithium ion batteries becomes below 6 Ah.

Table 1 indicates evaluation results where the present embodiment, the first to fourth modified examples, and the comparative example were applied to the battery casing 10.

TABLE 1

| Configuration of battery casing | Average cycle number when battery capacity is below 6 Ah (n = 10) | Variation |
|---|---|---|
| Present embodiment | 500 | 600 |
| First modified example | 480 | 800 |
| Second modified example | 480 | 800 |
| Third modified example | 500 | 600 |
| Fourth modified example | 540 | 500 |
| Comparative example | 380 | 2800 |

As can be understood from Table 1, when any of the present embodiment and the first to fourth modified examples was applied to the battery casing 10, a lithium ion battery could be obtained which was more stable than the configuration in the conventional example.

Patent Document 3 discloses a battery casing in which a plurality of cylindroid electrode assemblies are accommodated in an accommodation part with internal space shared.

Figure 14:
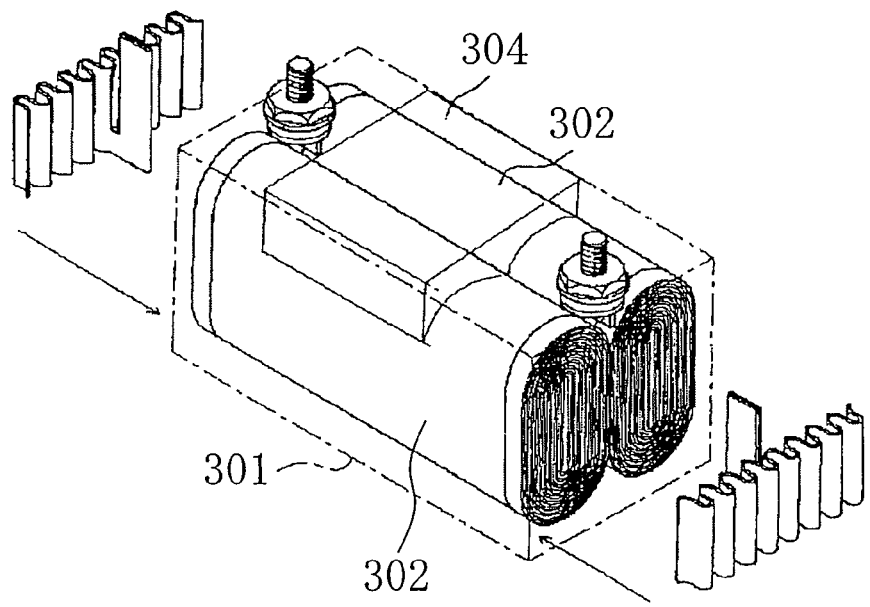
FIG. 14 is an illustration showing a configuration of a battery casing of a conventional sealed secondary battery.

FIG. 14 illustrates the configuration of the battery casing 301 disclosed in Patent Document 3, and shows the state that a plurality (two in FIG. 14) of cylindroid electrode assemblies 302 are accommodated in the battery casing 301. A solid member 304 for heat radiation is disposed between the battery casing 301 and the electrode assemblies 302.

This configuration may be similar to that of the present invention at first glance because the solid member 304 is formed in a shape agreeing with the shape of the space between the battery casing 301 and the electrode assemblies 302 to exhibit advantages of suppressing vibration and the like of the electrode assemblies 302 in addition to an advantages of heat radiation.

However, the solid member 304 is separate from the battery casing 301. Actually, the solid member 304 is inserted in the space between the electrode assemblies 302, and then the electrode assemblies 302 are accommodated into the battery casing 301. Accordingly, positioning thereof in manufacture may be complicated, and the outer circumferences of the electrode assemblies may be kept non-uniformly because of process variation and the like. As a result, uniform suppression cannot be achieved of off-core of the electrode assemblies upon an in crease in internal pressure by abnormal gas generation in some accommodation part.

The present invention has been described by referring to the preferable embodiments. However, the above description does not serve as any limitation, and various modifications are possible of course. For example, the accommodation parts 12a to 12d and the connecting parts 13a to 13c are formed of a thin plate having uniform thickness in the above embodiment. However, the connecting parts 13a to 13c may be thick so that the outer counter of the battery casing 10 is flat as far as at least the inner circumferences of the accommodation parts 12a to 12d have substantially the same shape as the outer circumferences of the electrode assemblies 20a to 20d.

The positive electrode plate 21 and the negative electrode plate 22 in the above embodiment are connected to the current collector plate 31 and the bottom of the battery casing 10 through the positive electrode lead 24 and the negative electrode lead 25, respectively. In another embodiment, the electrode assemblies 20a to 20d may have a generally called tabless structure in which end parts (mixture non-coated parts) of the current collectors composing the positive electrode plate 21 or the negative electrode plate 22 are directly welded to respective current collector plates, and such the electrode assemblies are connected to the current collector plate 31 and the bottom of the battery casing 10 by direct welding, by means of leads, or the like.

INDUSTRIAL APPLICABILITY

The present invention can attain stable characteristics of each electrode assembly and high reliability in a sealed secondary battery, and is therefore useful in sealed secondary batteries in which a plurality of electrode assemblies are accommodated in a battery casing.

The invention claimed is:

1. A sealed secondary battery, comprising: a plurality of electrode assemblies wound in cylindrical shape and sealed in a battery casing,
    wherein the battery casing includes,
        a plurality of cylindrical accommodation parts configured to accommodate the plurality of electrode assemblies, and
        at least one hollow connecting part having a cavity within configured to connect the accommodation parts adjacent to each other,
    the accommodation parts have inner circumferences having a substantially same shape as that of outer circumferences of the electrode assemblies,
    each of side portions of the at least one hollow connecting part is connected to the accommodation part along a side surface thereof,
    the accommodation parts adjacent to each other communicate physically with each other through the at least one hollow connecting part, and
    the battery case is configured to contain an electrolyte liquid and to allow said electrolyte liquid to flow between the accommodation parts and through the cavity of the at least one hollow connecting part.

2. The sealed secondary battery of claim 1, wherein the accommodation parts are filled with said electrolyte liquid, which is a nonaqueous electrolyte or an organic gel electrolyte.

3. The sealed secondary battery of claim 1, wherein the accommodation parts and the electrode assemblies are formed in elliptic cylindrical shapes.

4. The sealed secondary battery of claim 1, wherein
    the plurality of accommodation parts has end parts forming an open end deformed in a substantially elliptic shape along an envelope of outer contours of the accommodation parts, and
    the open end is sealed with a sealing portion in the substantially elliptic shape substantially same as an outer contour of the open end.

5. The sealed secondary battery of claim 1, wherein the plurality of accommodation parts and the at least one hollow connecting part connecting the accommodation parts are formed integrally with one another.

6. The sealed secondary battery of claim 1, wherein
    the accommodation parts form an end part sealed with a flat sealing portion,
    the sealing portion has an inside surface at which protrusions are formed, and
    the electrode assemblies have winding cores fitted to the protrusions.

7. The sealed secondary battery of claim 1, wherein the sealed secondary battery is a lithium ion battery.

* * * * *